Figure 9:
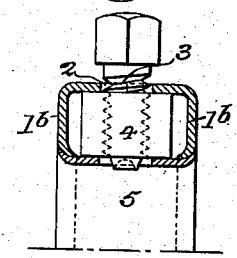

No. 894,884. PATENTED AUG. 4, 1908.
H. T. HALLOWELL.
SHAFT COLLAR.
APPLICATION FILED APR. 20, 1907.
4 SHEETS—SHEET 1.
Fig. 1.
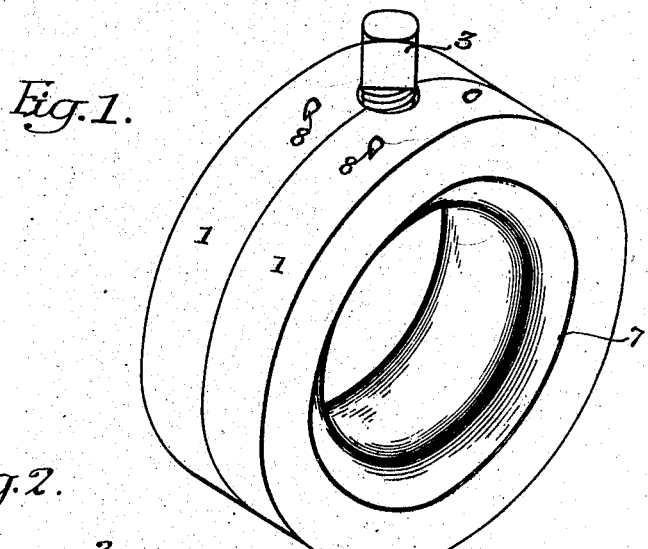
Fig. 2.
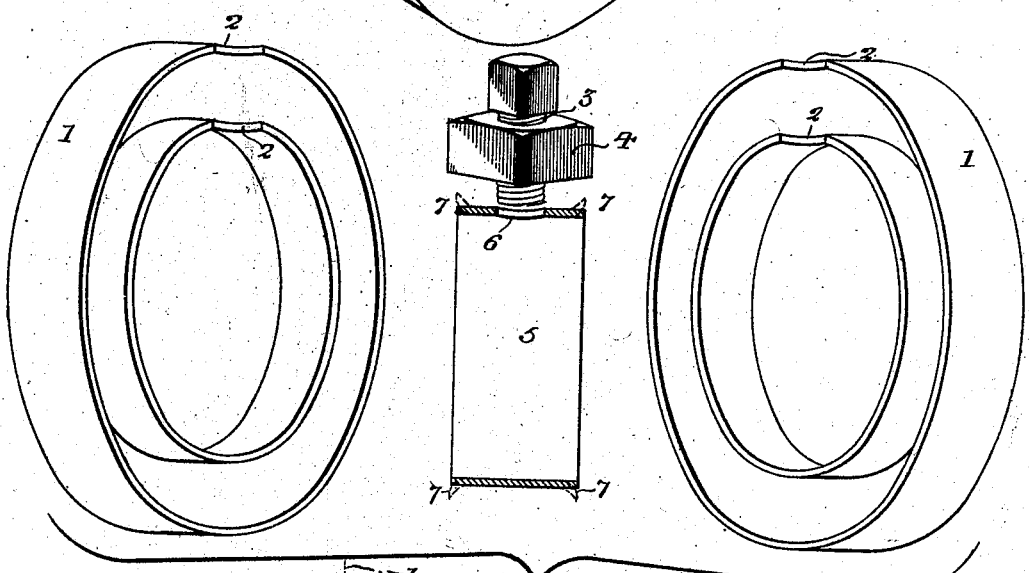
Fig. 3.
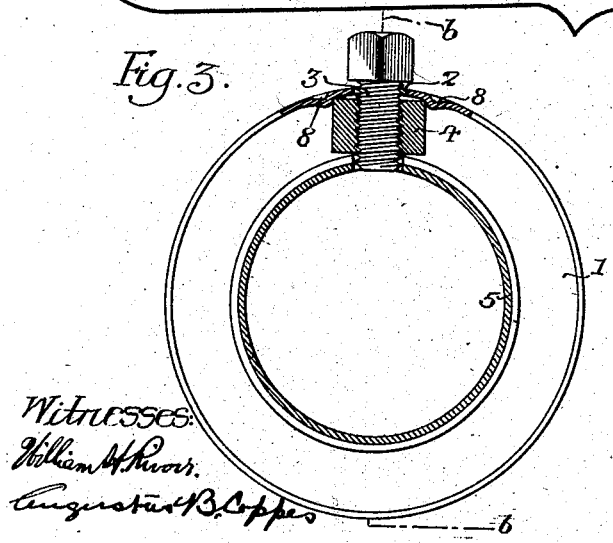
Fig. 4.
Witnesses:
William H. Rivot.
Augustus B. Coppes
Inventor
Howard T. Hallowell
by his Attorneys
Howson & Howson No. 894,884.　　　　　　　　　　　　　　　　PATENTED AUG. 4, 1908.
H. T. HALLOWELL.
SHAFT COLLAR.
APPLICATION FILED APR. 20, 1907.
4 SHEETS—SHEET 2.
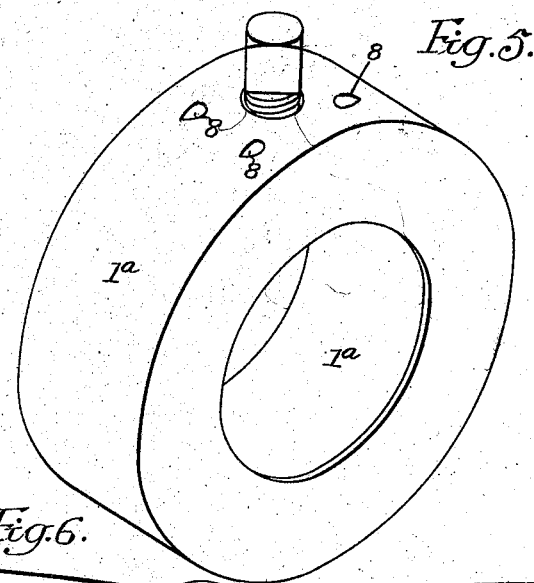
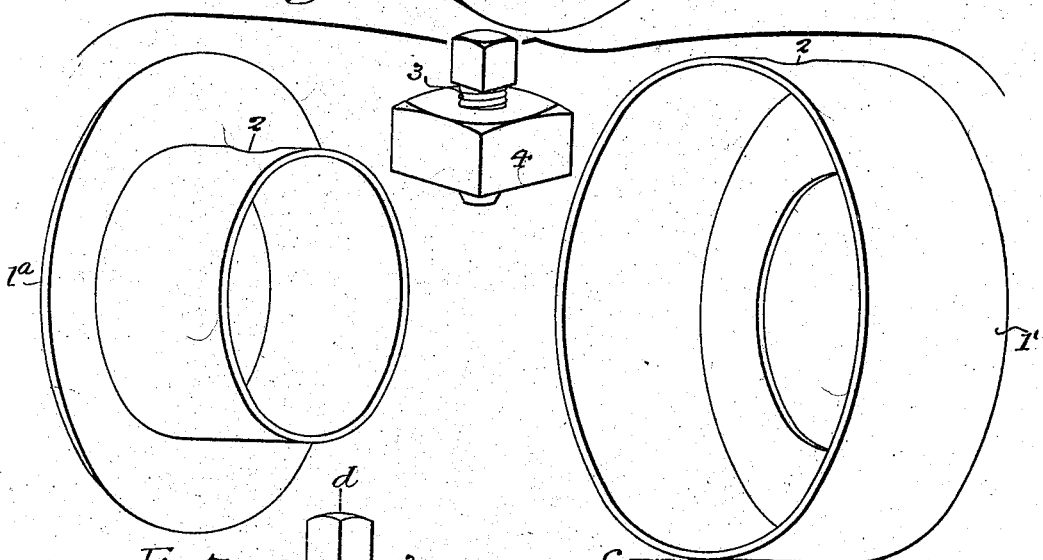
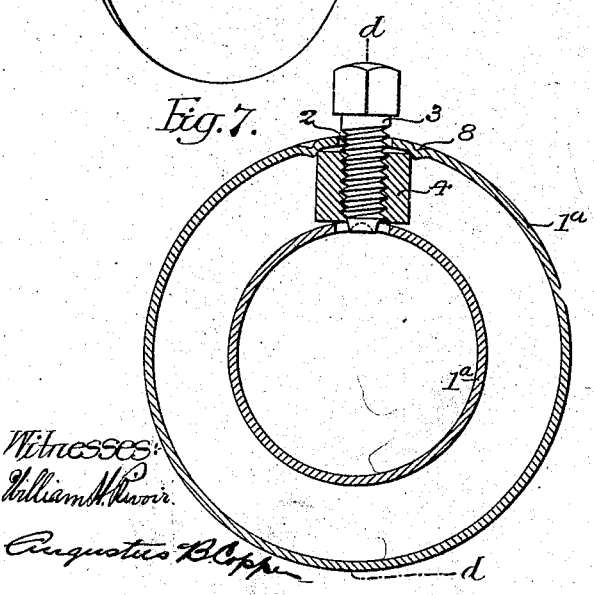
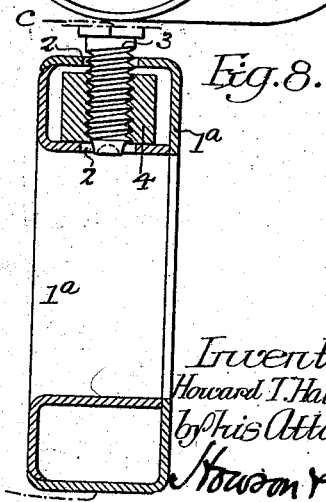
Witnesses:
Inventor:
Howard T. Hallowell.
by his Attorneys
Howson & Howson No. 894,884.

H. T. HALLOWELL.
SHAFT COLLAR.
APPLICATION FILED APR. 20, 1907.

PATENTED AUG. 4, 1908.

4 SHEETS—SHEET 3.

Witnesses:
William A. Purvis
Augustus B. Copper

Inventor
Howard T. Hallowell.
by his Attorneys,
Howson & Howson

No. 894,884.

H. T. HALLOWELL.
SHAFT COLLAR.
APPLICATION FILED APR. 20, 1907.

PATENTED AUG. 4, 1908.

4 SHEETS—SHEET 4.

Witnesses:
William H. Power
Augustus B. Copper

Inventor:
Howard T. Hallowell.
by his Attorneys,
Howson & Howson

UNITED STATES PATENT OFFICE.

HOWARD T. HALLOWELL, OF PHILADELPHIA, PENNSYLVANIA, ASSIGNOR TO STANDARD PRESSED STEEL COMPANY, OF PHILADELPHIA, PENNSYLVANIA, A CORPORATION OF PENNSYLVANIA.

SHAFT-COLLAR.

No. 894,884.     Specification of Letters Patent.     Patented Aug. 4, 1908.

Application filed April 20, 1907. Serial No. 369,336.

*To all whom it may concern:*

Be it known that I, HOWARD T. HALLOWELL, a citizen of the United States, residing in Philadelphia, Pennsylvania, have invented certain Improvements in Shaft-Collars, of which the following is a specification.

My invention relates to the construction of an annulus, such as a shaft collar, and the object of my invention is to form a shaft collar of sheet metal pressed into the desired shape and so constructed as to maintain in proper position a suitable nut or other support through which a set screw is passed for normally retaining such annulus or collar in place upon a shaft or other similar element.

My invention also includes the process of making an annulus or shaft collar of this type; the nut for the set screw being placed in proper position relatively to the parts comprising the annulus or collar preparatory to the final compression and securing of the same into the desired form.

My invention is fully shown in the accompanying drawings, in which:

Figure 1, is a perspective view of one form of annulus or collar embodying my invention; Fig. 2, is a view of the parts of the annulus or collar shown in Fig. 1, before assembling; Fig. 3, is a sectional view, taken on the line *a—a*, Fig. 4; Fig. 4, is a sectional view, taken on the line *b—b*, Fig. 3; Fig. 5, is a view similar to Fig. 1, showing another form of annulus or collar; Fig. 6, is a view of the parts of the structure shown in Fig. 5, before assembling; Fig. 7, is a sectional view, taken on the line *c—c*, Fig. 8; Fig. 8, is a sectional view, taken on the line *d—d*, Fig. 7, and Figs. 9 to 38, inclusive, are sectional views illustrating modified forms of shaft collars or annuli embodying my invention.

All of the structures forming the subject of my invention comprises sections or blanks of sheet metal pressed into shape to form a hollow member, and so disposed as to provide mutual connection and support, and to confine in proper relative position a suitable nut for the set screw employed with such collars.

In the structure shown in Fig. 1, the collar comprises annular members 1, 1, of similar size and shape, which have been previously formed from sheet metal blanks by suitable dies. These sections are provided with half round registering notches 2 in their inner and outer webs providing for the passage of a set screw 3, said set screw being arranged to engage a nut or other threaded support 4 which is mounted within the hollow space formed by the sections; being confined by suitable means in proper relative position to the registering notches of the sections forming the collar.

To maintain the sections 1,1, of the form of collar shown in Fig. 1, in the proper position with relation to each other, I provide an annular securing sleeve 5 disposed against the inner web or wall of said sections; such sleeve being apertured at 6 for the passage of the set screw 3, and in order to confine the sections 1,1, in position by said sleeve, I bead or turn the edges 7 of the same against the outer edge of the inner web of the sections 1, in the manner clearly shown in the drawings, such action binding the sections together and holding them against displacement. If desired, the sleeve 5 may be brazed or otherwise permanently secured to the sections 1,1. In the present instances, the sections 1,1, have their sharp corners rounded or beveled. This securing sleeve 5 is preferably formed into the necessary shape from a flat strip; the meeting edges of which may or may not be secured by brazing or other desirable means.

The nut or support 4, through which the set screw passes, is laid adjacent the sections forming the collar during the process of finally securing the same together, and to retain this nut in place I may provide various means, such for instance as an independent band disposed within the chamber formed by the webs or walls of the sections of the shaft collar, which band will have a seat formed for the retention of the nut; or I may displace the metal of the outer webs of the sections forming the shell by means of a suitable punch, as clearly shown at 8 in the drawings.

In the form of structure shown in Figs. 5, 6, 7 and 8, a different type of annulus or shaft collar is illustrated, in which two members, L-shaped in cross-section, are combined together to form an annulus or collar. These sections are indicated at 1ª, 1ª, and are secured together in the manner clearly shown in the drawing. The side web of the outer member is abutted by the annular web of the inner structure, while the annular web of the outer structure is turned over against the wall of the inner structure, which has been previously slightly beveled or beaded to permit such action. The nut is mounted between the sections previously to assembling the same together, and it is held either by the projections formed by the punch marks 8, or by displacing the metal of the shells against the same. This form of the annulus or shaft collar, as will be noted, is made of two sections only.

The subject-matter of my invention may be embodied in a very large number of structures, of which the several views of the drawings are clearly illustrative. With the exception of those which are riveted after assemblage, notably Figs. 14, 25, 34 and 35, they are all made in the manner described with reference to the structure shown in Figs. 1 to 8, inclusive.

Figure 10:
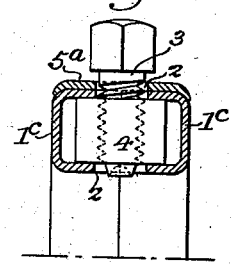
Figure 11:
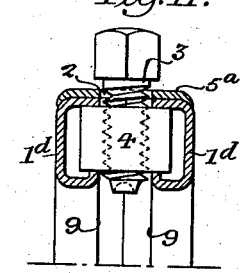
Figure 12:
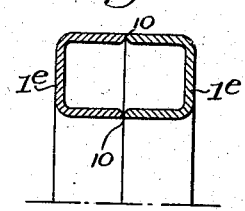
Figure 13:
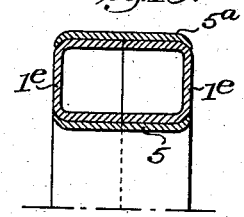
Figure 14:
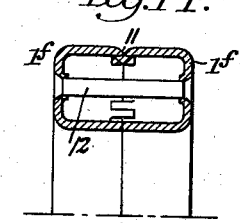
Figure 15:
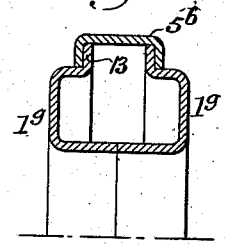
Figure 16:
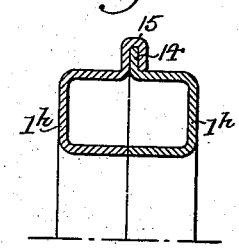
Figure 17:
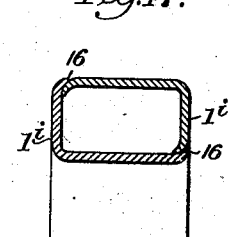
Figure 18:
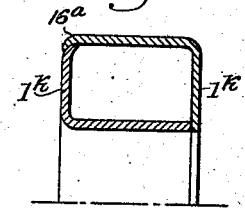
Figure 19:
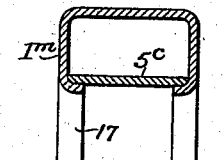
Figure 20:
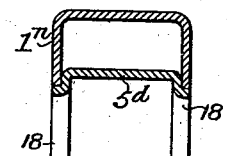
Figure 21:
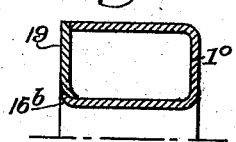
Figure 22:
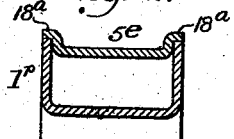
Figure 23:
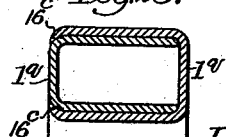
Figure 24:
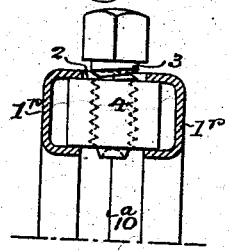
Figure 25:
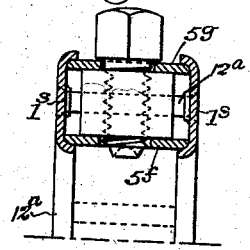
Figure 26:
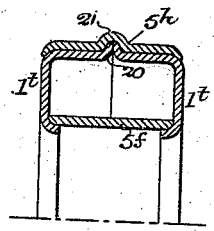
Figure 27:
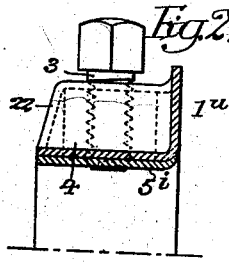
Figure 28:
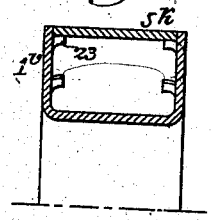
Figure 29:
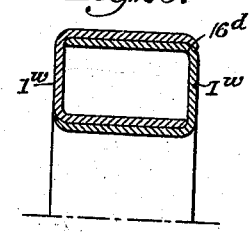
Figure 30:
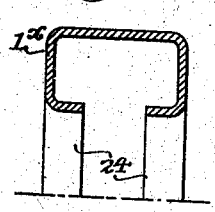
Figure 31:
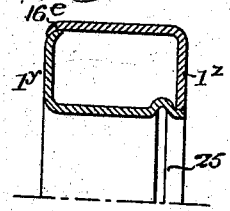
Figure 32:
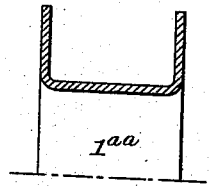
Figure 33:
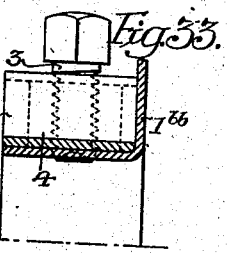
Figure 34:
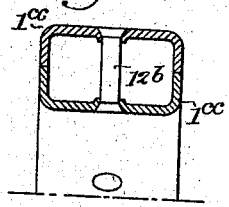
Figure 35:
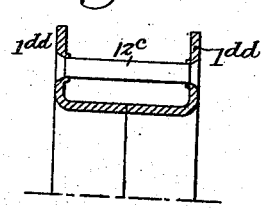
Figure 36:
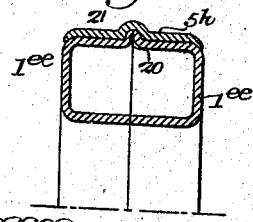
Figure 37:
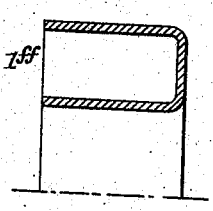
Figure 38:
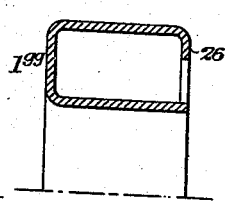

Fig. 9, shows a form of annulus or collar, comprising two sections or shells 1$^b$, which are confined together by an internal annular sleeve 5. Fig. 10, shows annular sections 1$^c$, of similar size and shape, confined by an external sleeve 5$^a$. Fig. 11, shows sections 1$^d$, of similar size and shape, confined by an external sleeve 5$^a$. In this instance, the sections 1$^d$ have an inner flange 9. Fig. 12, shows a structure comprising sections 1$^e$, of similar size and shape, which have their meeting edges brazed at the points 10. Fig. 13, shows sections 1$^e$, of similar size and shape, confined by internal and external securing sleeves 5 and 5$^a$, respectively. Fig. 14, shows a structure comprising sections 1$^f$, the inner meeting faces of which abut, while their outer meeting faces are provided with lugs 11, which interlock with each other. These sections are further secured together by rivets 12. Fig. 15, shows a structure, in which sections 1$^g$ are provided having abutting inner edges; which sections have outwardly projecting flanges 13 confined by a securing sleeve 5$^b$. Fig. 16, shows sections 1$^h$, both of which have outwardly projecting flanges 14 and 15; the latter being turned over the former. Fig. 17, shows L-shaped sections 1$^i$; the edges of the walls of one section being beaded over the other, as shown at 16. Fig. 18, shows a structure having L-shaped sections 1$^k$, in which the cylindrical part of one section abuts the side wall of the other; such sections being secured in place by beading the outer section over the inner, as shown at 16$^a$. Fig. 19, shows a single section 1$^m$, having its side walls turned over to form flanges 17, and confining an inner sleeve 5$^c$. Fig. 20, shows a single section 1$^n$, with an inner sleeve member 5$^d$ holding the same in relative position; such sleeve having side flanges 18 against which the walls of the section 1$^n$ abut. Fig. 21, shows a single section 1$^o$ with a side plate 19 applied thereto; the inner cylindrical portion of the section being beaded over said side plate at the point 16$^b$. Fig. 22, shows a single section 1$^p$; having a contour the reverse of the section 1$^n$ shown in Fig. 20, and having an external securing sleeve 5$^e$ with flanges 18$^a$ against which the side walls of the section abut. Fig. 23, shows sections 1$^q$, U-shaped in cross-section, which fit into each other; the outer section being turned down over the inner at the point 16$^c$. Fig. 24, shows sections 1$^r$, of similar size and shape, which are confined together by brazing at the point 10$^a$. Fig. 25, shows a structure made up of flanged side plates 1$^s$, and internal and external sleeves 5$^f$ and 5$^g$, respectively. This structure is further secured together by rivets 12$^a$. Fig. 26, shows a structure comprising sections 1$^t$, having external abutting flanges 20, with an internal securing plate 5$^f$, and an external securing plate 5$^h$; the latter having a grooved rib 21 to accommodate the flanges 20. Fig. 27, shows a single member 1$^u$, L-shaped in cross-section, having a raised portion 22 to accommodate the nut, and carrying an internal sleeve 5$^i$ holding the latter in place. Fig. 28, shows a U-shaped structure 1$^v$, having an external plate 5$^k$ supported upon lugs 23 carried by the side walls of such section. Fig. 29, shows a pair of similarly sized and shaped sections 1$^w$ fitting inside and outside each other, and beaded over at their diagonally opposite corners, as indicated at 16$^d$. Fig. 30, shows a single section 1$^x$, having inwardly disposed flanges 24. Fig. 31, shows a structure comprising sections 1$^y$ and 1$^z$; the section 1$^y$ having a flanged portion 25, against which a portion of the section 1$^z$ abuts; while diagonally opposite therefrom, the section 1$^z$ is turned down over the section 1$^y$, as indicated at 16$^e$. Fig. 32, shows a single U-shaped section 1$^{aa}$ with its walls disposed outwardly, indicated at 1$^{aa}$. Fig. 33, shows a single member 1$^{bb}$, L-shaped in cross-section, and having an external member 22$^a$ for carrying the nut. Fig. 34, shows two sections 1$^{cc}$, L-shaped in cross-section; the radial walls of which abut and are confined together by rivets 12$^b$. Fig. 35, shows two L-shaped sections 1$^{dd}$ with the edges of their cylindrical portions abutting, and being confined by the rivets 12$^c$. Fig. 36, shows two sections 1$^{ee}$, of similar size and shape, having their cylindrical portions abutting, and having outwardly disposed flanges 20 confined by an external sleeve 5$^h$ having a grooved rib 21 to accommodate said flanges. Figs. 37 and 38, show cylindrical structures 1$^{ff}$ and 1$^{gg}$, respectively, U-shaped in cross-section; the latter having an inwardly disposed flange 26 at one side wall of the same.

In completing the annulus or shaft collar, the sections of the same are assembled in a suitable manner; the nut being properly positioned and maintained in such position by means of the set screw, or a suitable pin, which is passed through the apertures of the several sections and then the sections are subjected to pressure while confined between suitable dies whereby the securing means, such as compressing the metal of such sections with respect to each other, or the employment of the sleeve 5, are applied, and the sections of the annulus or collar thereby locked against displacement. Before removing the set screw or pin, the nut is confined in place by displacing the metal of the sections relatively thereto, or by the punch immediately after removing the completed collar from the press.

I may, if desired, braze any and all of the abutting faces of the several forms of structures shown herein, and I may further harden the side wall or face of the respective collars which comes opposite the work. In all instances the strip used as the inner securing collar or sleeve may be made of flat metal with its abutting ends brazed or not as desired, and while the outer securing sleeves may also be made of such metal, the abutting edges of the same are preferably brazed.

I claim:

1. A hollow sheet metal annulus or collar for shafts, said annulus being apertured radially and having a separable, internally threaded member confined between the walls of the same in line with said apertured portion.

2. A hollow, pressed, sheet steel annulus or collar, in combination with a nut mounted within said collar, the latter being suitably apertured, and means for confining the nut in line with said apertures.

3. The combination of a plurality of pressed metal sections secured together and forming a shaft collar, said sections being apertured radially, and a screw supporting member confined between the walls of said sections and disposed in line with said apertured portion.

4. The combination of a plurality of sections of pressed steel forming an annulus or shaft collar, and a nut confined between the walls of said sections and held out of contact with the shaft.

5. The combination of a plurality of pressed metal sections, means for confining the same together, a nut mounted within said sections, and means carried by the latter for positioning said nut.

6. The combination, with a plurality of pressed metal sections forming an annulus or shaft collar, and a nut maintained within said sections for the reception of a set screw, said sections including confining means disposed within the chamber formed by the other sections for positioning said nut.

7. The combination of a plurality of sections of pressed metal forming a shaft collar, said sections being apertured radially, screw supporting means disposed within the same in line with said apertured portion, and means for securing said sections together.

8. The combination of a plurality of sections of pressed sheet metal of uniform thickness throughout forming a shaft collar, each of said sections being apertured radially, and a nut confined between said sections in line with said apertured portion.

9. The combination of a plurality of pressed metal sections of uniform thickness throughout, means for confining the same together, a nut mounted within said sections, and means carried by the latter for positioning said nut.

10. The combination of a plurality of pressed metal sections of uniform thickness throughout forming a shaft collar, a nut mounted within said sections for the reception of a set screw, and a confining member disposed within the chamber formed by said sections for positioning said nut.

11. The combination of a plurality of sections of pressed metal of uniform thickness throughout forming a shaft collar, said sections being apertured radially, screw supporting means confined by said sections and held in line with said apertured portion, and means for securing said sections together.

12. A hollow sheet metal annulus or collar for shafts made of a plurality of sections secured together, and screw supporting means confined by said sections and held out of contact with the shaft.

13. A hollow pressed steel annulus or collar for shafts made of a plurality of sections secured together, in combination with a nut confined by said sections and held out of contact with the shaft.

14. The combination of a plurality of pressed sheet metal sections, means for confining the same together, a nut mounted within said sections, means carried by the sections for positioning said nut, and a set screw carried by said nut.

15. A hollow sheet metal annulus or collar for shafts, said annulus being apertured radially and having screw supporting means disposed within the same in line with said apertured portion.

16. The combination of a plurality of sections of pressed steel forming an annulus or shaft collar, and a nut confined between said sections and lying below the inner surface of the peripheral wall of said structure.

17. The combination of a plurality of sections of pressed metal forming a shaft collar, each section being of uniform thickness throughout, screw supporting means carried by said sections and held out of contact with the shaft, and means for securing said sections together.

18. A sheet metal shaft collar having an external annular portion with an integral inwardly extending side web portion, in combination with a reverse section embodying an inner annular portion with an integral outwardly extending side web portion, said sections being suitably secured together, and means for securing such assembled member to a shaft.

19. A sheet metal shaft collar having annular walls, and two side walls, a plurality of said walls having an integral relationship and all being secured in proper relation to one another, in combination with a nut confined between said sections.

In testimony whereof, I have signed my name to this specification, in the presence of two subscribing witnesses.

HOWARD T. HALLOWELL.

Witnesses:
MURRAY C. BOYER,
JOS. H. KLEIN.